June 5, 1945.  J. C. JOHNSON ET AL  2,377,786
POWER SHOVEL
Filed Dec. 16, 1944  2 Sheets-Sheet 1

Inventor
JOHN C. JOHNSON
WILLIAM R. MILNER

By Clarence A. O'Brien
and Harvey B. Jacobson
Attorneys

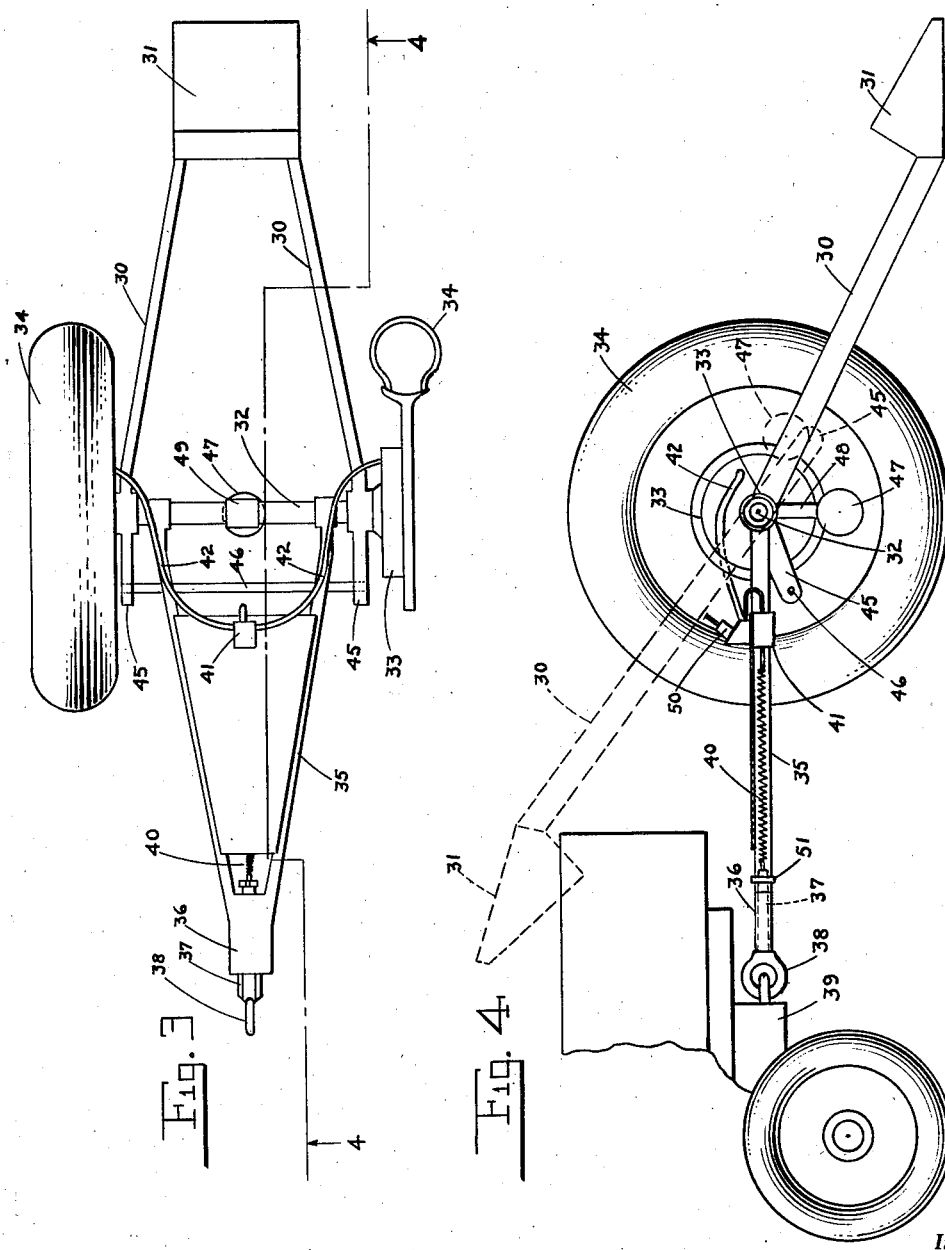

Patented June 5, 1945

2,377,786

UNITED STATES PATENT OFFICE 2,377,786

POWER SHOVEL

John C. Johnson, Boswell, Ind., and William R. Milner, Burlingame, Calif.

Application December 16, 1944, Serial No. 568,484

2 Claims. (Cl. 214—81)

This invention relates to a power shovel, and more particularly to such a shovel adapted to be energized by a truck or similar vehicle.

A primary object of this invention is the provision of an improved power shovel, adapted to be attached to the rear end of a truck or the like, and provided with integral means whereby the same may be utilized to first scoop out a shovel of earth or the like, and second to dump the same into the body of the vehicle, the power being supplied by the movement of the vehicle.

An additional object of this invention is the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and disclosed in the accompanying drawings, wherein there are shown two preferred embodiments of this inventive concept.

In the drawings:

Figure 3 is a top view partially in elevation and partially in section, disclosing a modified form of this inventive concept, and Figure 4 is a side view partially in section and partially in elevation disclosing the device shown in Figure 3 in association with a truck, a fragment of which is disclosed.

Similar reference characters refer to similar parts throughout the several views of the drawings.

Figure 1:
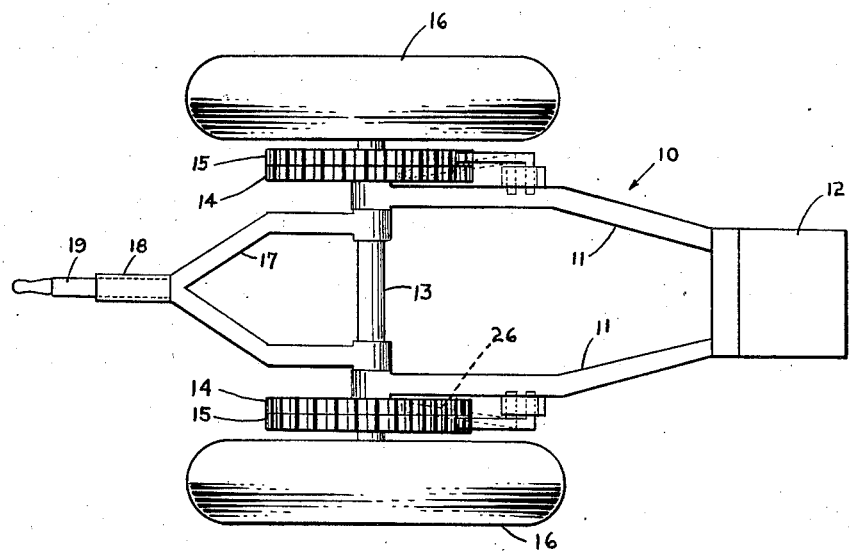
Figure 1 is a top plan view of one form of device embodying the instant inventive concept.

Having reference now to the drawings and more particularly to Figure 1, the device of the instant invention is comprised of a frame generally indicated at 10, including two extending arms 11 having a shovel blade 12 at their extremities, and their opposite extremities being provided with apertures adapted to surround an axle 13 for pivotal movement thereabout.

The axle 13 has secured thereto, exteriorly of the members 11 on opposite sides a pair of ratchet members 14 and 15, and carries exteriorly of the ratchet members wheels 16. A bracket 17 pivotally secured to the axle 13 between the members 11 terminates in a sleeve 18, within which is a draw bar 19, terminating in an eye 20 and secured in position as by a cotter pin 21 passed through suitable apertures in the sleeve 18 and the bar 19, the eye 20 being adapted to attachment to a suitable towing vehicle such as a truck.

Each of the members 11 is provided, with a transversely extending portion 22 to the opposite sides of which are pivotally secured, as by pivots 23 and 24, upper and lower pawls 25 and 26, one of which, 25, is positioned for engagement with the associated ratchet 15 and the other of which, 26, is curved and positioned for engagement with the ratchet 14.

From the foregoing the operation of the device should now be readily understandable.

Figure 2:
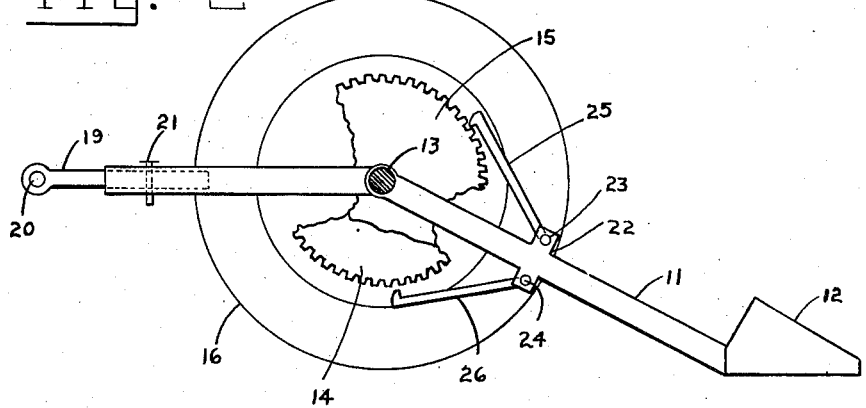
Figure 2 is a side view partially in section and partially in elevation of the device shown in Figure 1.

When the parts are in the position as disclosed in Figure 2, and the truck is backed up, the shovel 12 scoops up earth or the like, against which it is impelled.

After the shovel has been filled, the truck is moved forwardly, and the pawl 25 engaging the fixed ratchet gear 15, lifts the arms 11 and the associated shovel 12 and rotates the same about the axle 13, until the contents of the shovel are dumped into the truck body, at a point substantially above the draw bar 19.

Upon reverse motion of the truck as the same is backed up, gravity causes the shovel member to fall into such position that the ratchet 14 is engaged by the pawl 26, and the shovel is carried rearwardly until such time as it is permitted to fall by gravity into the position shown in Figure 2, whereupon the pawl 26 falls free and the device is in position for continued operation.

Figures 3 and 4 disclose a modified form of shovel adapted to be operated by hydraulic power. In this modification frame members 30 terminate in a shovel blade 31, and are pivotally secured on an axle 32, provided with a hydraulic brake drum 33 and adapted to support for rotation wheels 34. A second frame 35 extends forwardly of the axle 32, and terminates in a sleeve 36, within which is slidably positioned a draw bar 37. The draw bar 37 terminates in an eye 38 adapted to be associated in any desired manner with a truck body 39. The inner extremity of the draw bar 37 has secured thereto a spring 40 the opposite end of which is secured to a suitable hydraulic valve mechanism 41. Feed lines 42 run from the hydraulic mechanism to the hydraulic brake drums 33, and a suitable feed line (not shown) provides hydraulic fluid from any suitable source.

The extremities of the frame members 30 beyond the axle 32 are offset at a downwardly depending angle as indicated at 45, and their extremities are connected by a transverse bar 46. A relatively heavy counterweight 47 is freely swingable about axle 32, and is secured thereto as by an arm 48 terminating in a journal 49.

A release switch 50 is provided on the upper portion of the hydraulic valve mechanism 41, and adapted to be actuated by abutment with the frames 30, in a manner and for a purpose to be more fully described hereinafter.

From the foregoing the operation of the device should now be readily understandable. When the device is in the position shown in full lines in Figure 4, and the truck 39 backs up, the shovel or scoop 31 is adapted to be filled with earth or the like.

As the truck is reversed and moved forwardly the hydraulic valve 41 is actuated by means of the spring 40, a pin 51 serving to take up the strain between the draw bar 37 and the sleeve 36, to lock by means of a hydraulic fluid the brake drums 33, in such manner as to secure the frames 30 to the axle 32 for rotation thereabout. Continued forward motion of the truck thus rotates the shovel 31 to the position shown in dotted lines in Figure 4, whereupon the contents of the shovel are dumped into the truck body. As the shovel reaches the maximum position as shown in dotted lines it abuts the release mechanism 50, which actuates the hydraulic mechanism to release the brakes. During the forward motion of the device the cross bar 46 engages the counterweight 47 and rotates the same to the position disclosed in dotted lines in Figure 4. Upon release of the hydraulic mechanism the counterweight 47 is sufficiently heavy to act reversely against the bar 46 and rotates the shovel about the axle 32 until the same is in a position to drop by gravity to the ground as disclosed in Figure 4 in full lines.

From the foregoing it will now be seen that there is herein provided an improved power shovel accomplishing all the objects of this invention and others including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

We claim:

1. In a power shovel in combination, an axle, a frame pivotally secured to said axle, a shovel blade at the extremity of said frame, wheels carried by said axle, means secured to said axle for connecting said shovel to a towing vehicle, means for securing said frame to said axle for rotation therewith upon forward movement of the vehicle, said last-mentioned means including ratchet means secured to said axle, and pawl means secured to said frame, and means for returning said shovel to digging position upon reverse motion of said vehicle, said means including second ratchet means secured to said axle and second pawl means secured to said frame.

2. In a power shovel in combination, an axle, a frame pivotally secured to said axle, a shovel blade at the extremity of said frame, wheels carried by said axle, means secured to said axle for connecting said shovel to a towing vehicle, means for securing said frame to said axle for rotation therewith upon forward movement of the vehicle, said means including a hydraulic brake drum adapted to lock said frame to said axle through said connecting means, when said vehicle moves forwardly, means for releasing said lock when said shovel is rotated to a predetermined position, and counterweight means for returning said shovel to digging position when said lock is released.

JOHN C. JOHNSON.
WILLIAM R. MILNER.